Aug. 25, 1942.   J. DRABIN   2,294,079
VISCOSITY MEASURING DEVICE
Filed Jan. 5, 1942   2 Sheets-Sheet 1
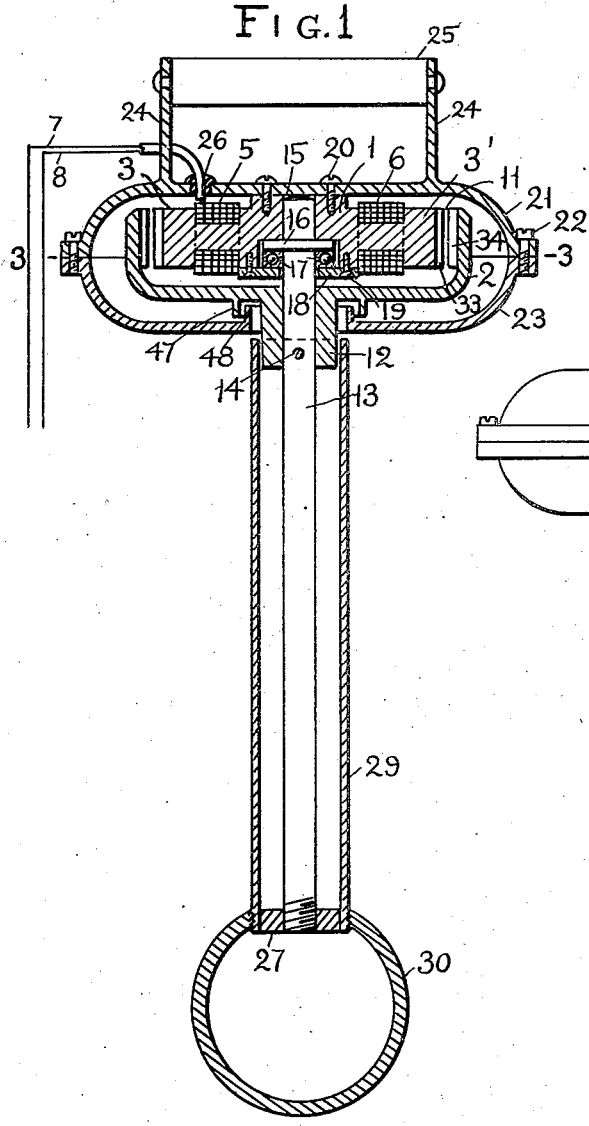
JOHN DRABIN
INVENTOR.
BY John P. Nikonow
ATTORNEY Aug. 25, 1942.   J. DRABIN   2,294,079
VISCOSITY MEASURING DEVICE
Filed Jan. 5, 1942   2 Sheets-Sheet 2
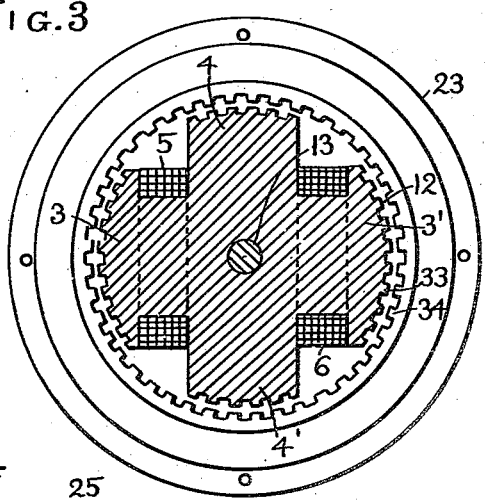
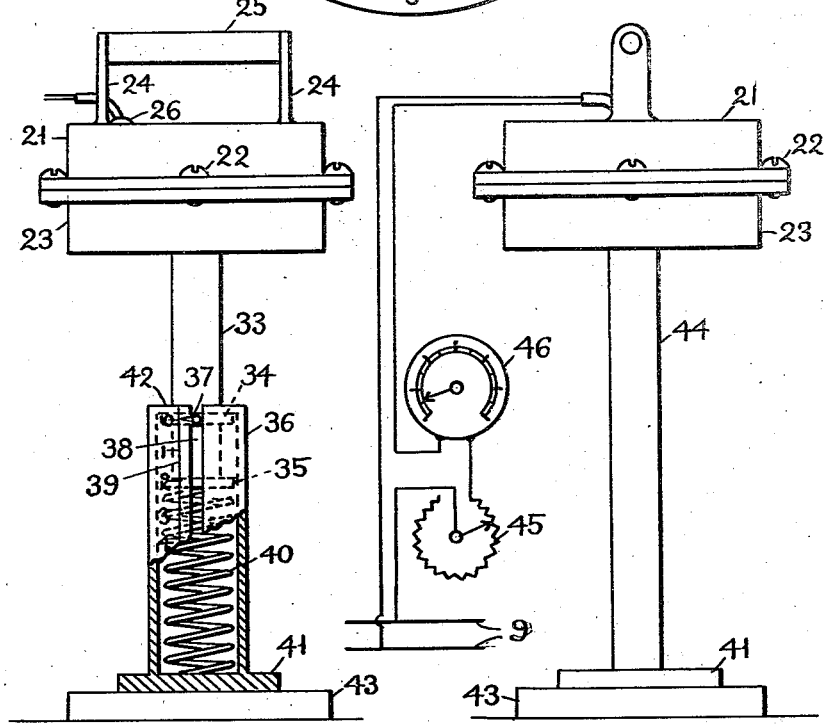
John Drabin
INVENTOR.
BY John P. Hironow
ATTORNEY Patented Aug. 25, 1942

2,294,079

UNITED STATES PATENT OFFICE 2,294,079

VISCOSITY MEASURING DEVICE

John Drabin, New York, N. Y.

Application January 5, 1942, Serial No. 425,637

5 Claims. (Cl. 265—11)

My invention relates to viscosity measuring devices and has particular reference to devices for measuring viscosity of liquids and semi-liquids.

Ordinary viscosity meters have a disadvantage in that they are not adapted for testing liquids in a bulk, so that a sample of a liquid must be taken into laboratory for a time-consuming test. The testing process is usually further complicated by the necessity of reading electrical meters requiring various corrections. It is evident that such tests may seriously delay the manufacturing processes, especially when it is necessary to determine quickly whether the desired degree of consistency of the particular liquid or semi-liquid mixture is reached for further operating processes.

My invention has for its object to provide a device which can be used for testing viscosity of liquids in containers in which the liquids are stored or being prepared for further processing, the tests being made by a simple immersion of a portion of the device in the liquid.

My invention is based on the fact that synchronous motors maintain their speed up to a point where the applied resistance torque reaches a certain definite value at which the motor suddenly stops. In my device I employ such a motor with a cylinder or other suitable rotating member attached to the rotor of the motor. By measuring the degree of immersion of the rotating member into the liquid and noting the point at which the motor is stopped, an accurate measurement of the viscosity of the liquid can be obtained. With my device it is possible, therefore, to measure viscosity of liquids or semi-liquids which do not flow under ordinary conditions and whose viscosity is difficult to measure by ordinary means.

In a modified device I provide an arrangement for testing lubricating properties of liquids by measuring the degree of compression of the device against a lubricated surface.

My device can be employed with several scales for liquids varying greatly in their viscosity, transition from one scale to the other being provided by means of a rheostat which changes the pull-out torque of the motor.

My invention is more fully described in the accompanying specification and drawings, in which:

Fig. 1 is a sectional elevational view of my device;

Fig. 2 is an outside view of a modified or simplified device;

Fig. 3 is a sectional view taken on the line 3—3 of Fig. 1;

Fig. 4 is an elevational view of a modified device partly in section; and

Fig. 5 is a view of a modified device;

Fig. 6 is a diagram of connections.

My viscosity testing device consists of a synchronous motor having a stator 1 and a rotor 2. The motor is of any ordinary synchronous type, but I prefer to use a multiple slow-speed "reaction" type of motor, such as type 9841 of the General Electric Company, described in the R. C. A. bulletin No. 2996. The stator has four pole pieces 3, 3' and 4, 4', with two coils 5 and 6 connected by leads 7 and 8, shown diagrammatically in Fig. 1, with a source of current 9 through a rheostat 10. The rotor is separated from the stator by a small air gap 11 and has a hub 12 fastened to a shaft 13 as by a pin 14. The upper end of the shaft is journaled in a central bore 15 in the stator and has a collar 16 resting on a thrust bearing 17 held in a recess in the stator and supported underneath by a plate 18 attached to the stator by screws 19.

The stator 1 is attached by screws 20 to an upper casing 21 fastened by screws 22 to lower casing 23. The upper casing has brackets 24 with a handle 25 for handling the device. The leads 7 and 8 are brought into the casing through an insulation bushing 26.

The shaft 13 is threaded at the end for a nut 27 fitted in the end of a tube 29. The upper end of the tube 29 is slidably guided by the hub 12. A hollow ball 30 may be threaded on the lower end of the tube 29 for increasing the initial resistance of the tube to rotation. The tube has scales 31, 32, 32' and 32", with divisions calibrated in units of viscosity, the scale 31 to be used without the ball 30, the scale 32 with the ball, and the scales 32', 32", to be used with reduced pull-out torque. The scales are shown with arbitrary divisions, but they may be calibrated in any accepted units of viscosity (for instance, absolute or Saybolt).

The stator and the rotor have teeth 33 and 34 respectively, the teeth being equally spaced so that in one position of the rotor its teeth register with the stator teeth and, when moved through a distance of one tooth, the rotor teeth will register with the slots between the teeth of the stator. With the stator energized, the rotor, if given initial spin, will accelerate until it reaches synchronous speed, determined by the frequency of the alternating current passing through the coils of the stator. With every alternation of the current the rotor turns through an angle corresponding to the distance between two successive teeth. Thus, when using 60-cycle current having 7200 alternations per minute, and with 100 teeth on the rotor, the latter will rotate at a speed of 72 revolutions per minute.

The speed will not be changed by the application of external resistance to rotation until a certain limiting pull-out torque is reached when the motor will suddenly stop. The value of the pull-out torque is constant for a given voltage and it can be varied by introducing resistance in the circuit as by turning the handle of the rheostat 10. An ordinary phonograph motor can be used for this purpose.

For testing the viscosity of a liquid, the device is held by the handle 25 and the rotor is given initial rotary impulse by hand until it begins to turn at a synchronous speed. The rotating tube 29 is then immersed in the liquid with the rotor turning at the synchronous speed. The tube is gradually lowered until the resistance torque due to the viscosity of the liquid reaches the limiting pull-out value and the motor stops. The value of the viscosity is then directly read on the scale.

In view of the fact that different liquids and semi-liquids have widely differing values of viscosity which it would be difficult to express in a single scale, the tube 29 is provided with several scales, each scale being used for one particular range of viscosities. Thus, scale 31 is used for relatively heavy liquids, with the ball 30 removed and with the resistance cut out, i. e., with full voltage across the motor terminals. Scale 32 is used with the ball 30 attached for testing lighter liquids. The added resistance of the ball is equivalent to the corresponding extension of the tube 29, so that the scale starts with an intermediate division such as 5. A more accurate reading is thus made possible, the divisions being correspondingly larger.

The scales 32', 32" can be used for testing still lighter liquids, the pull-out torque being reduced by moving the rheostat handle to one of the positions II, III, etc. The device in Fig. 2 is shown with the ball 30 removed, for using lower viscosity scale.

A modified device is shown in Fig. 4. The shaft 33 has spaced collars 34 and 35 sliding in a tube 36. The collar 34 has a lug 37 extending to the outside through a slot 38 in the tube and having a pointer over a scale 39. The lower collar 35 rests against the upper end of a spring 40, whose lower end is supported on a disc 41 forming the bottom of the tube 36. The upper end of the tube has a flange 42 for preventing the removal of the shaft from the tube.

The tube and disc 41 rotate with the shaft 33, being held together by the lug 37. The disc 41 is placed on an anvil or block 43 with a layer of a lubricating substance therebetween. The device is gradually pressed against the block until the motor stops. The lubricating value of the substance then corresponds to a division on the scale 39 indicated by the pointer 39 at the moment when the motor is stopped. An antifrictional roller 37' may be placed on the lug 37 to reduce frictional resistance.

The device shown in Fig. 5 has a straight shaft 44 with the disc 41. Viscosity or friction is measured by measuring the pull-out torque. The latter is varied by a rheostat 45, the corresponding pull-out voltage being indicated on a meter 46. It should be noted that normal voltage fluctuations practically have no effect on the accuracy of readings, because the resultant very small torque variations lie within errors of observation. Large voltage variations must be employed for substantial changes in the torque in accordance with Fig. 5.

In order to prevent drops of a liquid from getting into the motor when the device is accidentally turned over, a lock is provided in the form of a skirt 47 on the rotor enclosing a tubular extension 48 on the casing 23.

My device in a simplified form can be made without the ball 30 and without the rheostat and with a single scale.

My device has an important advantage in that it can be used for testing liquids and semi-liquids without interrupting the manufacturing processes, so that the viscosity can be quickly determined at any given moment in a tank or vat where the solution or mixture is being prepared, at the exact operating temperature and while the viscosity is being changed as by the addition of soluble substances. The measurements can be made by the operators themselves without the necessity of taking the sample into the laboratory and waiting for the results of such tests. Moreover, the device itself is very rugged and practically foolproof, since a very simple brushless motor is used with a single moving part.

Synchronous motors of a standard type can be used, such as ordinary portable phonograph motors.

It is understood that my viscosity measuring device may be further modified without departing from the spirit of the invention, as set forth in the appended claims.

I claim as my invention:

1. A viscosity meter comprising an alternating current synchronous motor having a substantially constant pull-out torque, a member operatively connected with the motor adapted to frictionally engage a substance whose viscosity it is desired to measure, the member being adapted to be moved so as to progressively increase the degree of engagement of the substance by the member until the limiting pull-out torque is reached and the motor stops, and means to measure the viscosity of the substance by measuring the degree of engagement of the substance by the member.

2. A viscosity meter comprising an alternating current synchronous motor having a substantially constant pull-out torque, an elongated member operatively connected with the motor adapted to be progressively immersed in a liquid for measuring its viscosity, and means to measure the viscosity of the liquid by measuring the depth of immersion of the member at which the motor is stopped.

3. A viscosity meter comprising an alternating current synchronous motor having a substantially constant pull-out torque, a cylinder connected with the motor shaft adapted to be progressively immersed in a liquid for measuring its viscosity, and calibrations on the cylinder for indicating the depth of immersion at which the motor stops, thereby measuring the viscosity of the liquid.

4. A viscosity meter comprising an alternating current synchronous motor having a substantially constant pull-out torque, a member operatively connected with the motor adapted to be placed in contact with a substance whose viscosity it is desired to measure, means when a progressively increasing pressure on the member, so as to progressively increase the resistance to rotation of the member, and means to measure the pressure on the member at the moment when the pull-out torque is reached and the motor stops, thereby measuring the viscosity of the substance.

5. A viscosity meter comprising an alternating current synchronous motor having a substantially constant pull-out torque for a given voltage, an elongated member operatively connected with the motor adapted to be placed in contact with a liquid for measuring its viscosity, while progressively increasing the contact resistance of the liquid until the motor stops, and means to measure the viscosity of the liquid by measuring the pull-out torque at which the motor stopped.

JOHN DRABIN.